(12) United States Patent
Mason et al.

(10) Patent No.: US 7,558,808 B2
(45) Date of Patent: Jul. 7, 2009

(54) DATA MODEL FOR PERFORMANCE MANAGEMENT SYSTEM

(75) Inventors: Miranda L. Mason, Evergreen, CO (US); Michelle McLeod, Centennial, CO (US)

(73) Assignee: Accenture Global Services GmbH, Schaffhausen (CH)

( * ) Notice: Subject to any disclaimer, the term of this patent is extended or adjusted under 35 U.S.C. 154(b) by 254 days.

(21) Appl. No.: 11/252,099

(22) Filed: Oct. 17, 2005

(65) Prior Publication Data

US 2007/0088730 A1    Apr. 19, 2007

(51) Int. Cl.
G06F 7/00 (2006.01)
G06F 17/00 (2006.01)
G06F 17/30 (2006.01)

(52) U.S. Cl. ......................... 707/104.1; 707/3
(58) Field of Classification Search ................. 707/101, 707/3, 102, 104.1
See application file for complete search history.

(56) References Cited

U.S. PATENT DOCUMENTS

| | | | |
|---|---|---|---|
| 5,321,605 A * | 6/1994 | Chapman et al. | 705/7 |
| 5,548,749 A * | 8/1996 | Kroenke et al. | 707/102 |
| 5,926,810 A * | 7/1999 | Noble et al. | 707/4 |
| 5,983,227 A | 11/1999 | Nazem et al. | |
| 6,266,661 B1 * | 7/2001 | Lewish et al. | 707/3 |
| 6,345,239 B1 | 2/2002 | Bowman-Amuah | |
| 6,425,525 B1 | 7/2002 | Swaminathan et al. | |
| 2003/0149614 A1 | 8/2003 | Andrus et al. | |

OTHER PUBLICATIONS

Jeffrey A. Hoffer et al., Modern Database Management, Publisher: Prentice Hall; 7 edition (Apr. 6, 2004), pp. 115, 125, 163, 468.*
Jeffrey A. Hoffer et al., Modern Database Management, Publisher: Prentice Hall; 7 edition (Apr. 6, 2004), pp. 68, 69, 126, 128, 163, 206, 207, 209, 467, 468.*
Jeffrey A. Hoffer et al., Modern Database Management, Publisher: Prentice Hall; 7 edition (Apr. 6, 2004), pp. 68, 69, 126, 128, 163, 206, 207, 209, 467, 468.*

* cited by examiner

*Primary Examiner*—Mohammad Ali
*Assistant Examiner*—Alexey Shmatov
(74) *Attorney, Agent, or Firm*—Brinks, Hofer, Gilson & Lione

(57) ABSTRACT

A performance management system renders performance management data and computed and aggregated metrics in a portfolio view. The performance management data flexibly calculates metrics from elemental data, aggregates the data within and across hierarchies, and establishes cross hierarchy performance management targets. Cross hierarchy performance management targets provide deeper insight into business performance through which the performance management system meets the performance management reporting challenges of modern, complex, global businesses.

11 Claims, 14 Drawing Sheets

| MO_CapOff_Fct | |
|---|---|
| PK,FK3<br>PK,FK2<br>PK,FK5 | CapOffKey  602<br>MeasureKey<br>MonthKey |
| <br><br><br><br><br><br><br><br><br><br><br><br><br><br><br><br>FK1 | Value  604<br>YTDValue<br>OverallTarget<br>YTDTarget<br>HighOverallTarget<br>LowOverallTarget<br>UpperRangeTarget<br>LowerRangeTarget<br>StatusFl<br>TrendFl<br>TrendingFl<br>UpperLimitFl<br>ABSFl<br>DSTFl<br>InsDateTime<br>UpdDateTime<br>CommentKey |

| CapOffKey | GeoUnitKey | MeasureKey | MonthKey | Value | Overall Target |
|---|---|---|---|---|---|
| 1 | 1 | 1 | 1 | $10,000,000 | $12,000,000 |

DATA MODEL FOR PERFORMANCE MANAGEMENT SYSTEM

BACKGROUND

1. Technical Field

This invention relates to data models and processing systems for complex performance management reporting. In particular, this invention relates to multi root data models and processing systems which provide a flexible mechanism for organizing and relating performance management data and reporting aggregated results across a wide variety of organizational hierarchies and levels as defined in the data model.

2. Background Information

Businesses are continually driven to maximize performance throughout the organization. Outsourcing has emerged as a widely applicable and popular procedure that businesses employ to reduce costs, increase profitability, and focus the business on its core operations. A business may outsource nearly any aspect of it operations.

Outsourcing providers have responded to the desire to outsource business functions. For example, many outsourcing providers have established independent outsourcing centers which deliver specific outsourcing offerings. Other outsourcing providers manage and provide comprehensive outsourcing services through a global delivery network. Outsourcing provides one avenue through which a business may increase performance.

With outsourcing, and the more general need to maximize performance, comes the need to provide performance management tracking and reporting. Providing excellent performance management is a difficult challenge, however. Businesses today often span the globe, deliver diverse product lines, and implement complex organizational structures. In the past, performance management reporting was limited in scope and capability, and did not have the flexibility to meet the performance management reporting challenges of modern, global businesses.

BRIEF SUMMARY

A performance management data model defines multiple hierarchies and cross hierarchies with dimension tables and fact tables. Selected fact tables index multiple dimensions from more than one hierarchy to form cross hierarchy fact tables. Through the cross hierarchy fact tables, the data model implements a very flexible mechanism for setting specific cross hierarchy performance targets. The dimension and fact tables may be populated with additional performance management data including actual performance measurements.

A performance management system which includes the data model provides enhanced performance reporting capability. In one implementation, the performance management system includes a processor, a database implementing the performance management data model, and a memory. The performance management system renders performance management data which the database has been organized into and across multiple hierarchies.

The processor executes a performance management program which obtains a portfolio view selection from an operator. The processor retrieves a portion of the performance management data based on the portfolio view selection and renders the performance management data on a user interface for review by the operator. In particular, the processor may render the performance management targets obtained from the cross hierarchy fact tables to provide deeper insight into business performance. The cross hierarchy performance management targets assist the performance management system in meeting the performance management challenges of modern businesses with complex global business models.

BRIEF DESCRIPTION OF THE DRAWINGS

FIG. 6 shows an example of a fact table which the data model may define in the database of the performance management system.

FIG. 8 shows a row of the cross hierarchy fact table of FIG. 7.

DETAILED DESCRIPTION

The elements illustrated in the Figures interoperate as explained in more detail below. Before setting forth the detailed explanation, however, it is noted that the discussion below, regardless of the particular implementation being described, provides examples and is not limiting. For example, although selected aspects, features, or components of the implementations are depicted as stored in program, data, or multipurpose system memories, all or part of systems and methods consistent with the data model and performance management system may be stored on or read from other machine-readable media, for example, secondary storage devices such as hard disks, floppy disks, and CD-ROMs; electromagnetic signals; or other forms of machine readable media either currently known or later developed.

Furthermore, although this specification describes specific components of a data model and a performance management system, methods, systems, and articles of manufacture consistent with the performance management technology may include additional or different components. For example, a processor may be implemented as a microprocessor, microcontroller, application specific integrated circuit (ASIC), discrete logic, or a combination of other types of circuits acting as explained above. Databases, tables, and other data structures may be separately stored and managed, incorporated into a single memory or database, or generally logically and physically organized in many different ways. As another example, program functionality may be implemented in a single program, divided between multiple programs, or distributed across multiple memories and processors.

Figure 1:
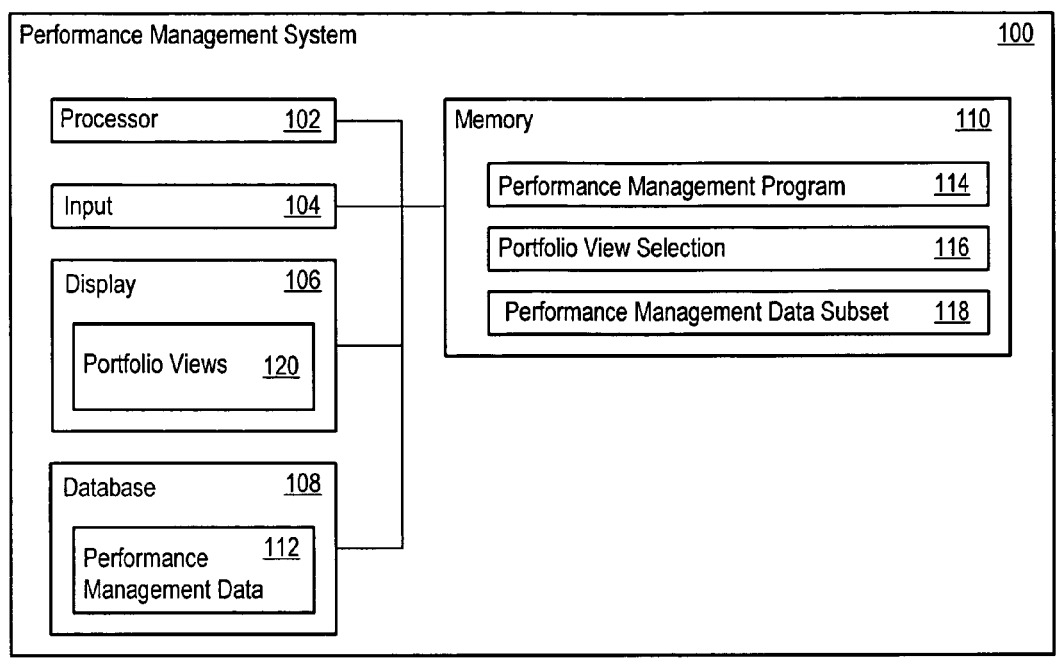
FIG. 1 shows a performance management system including a database which organizes performance management data according to a data model defining cross-hierarchical performance targets.

FIG. 1 shows a performance management system 100. The performance management system 100 includes a processor 102, input devices 104, and a display 106. The performance management system 100 also includes a performance management database 108 and a memory 110. The performance management system 100 may implement and deliver the functionalities described in U.S. patent application Ser. No. 10/961,765, originally titled "Outsourcing Command Center", filed Oct. 8, 2004. This application incorporates U.S. patent application Ser. No. 10/961,765 in its entirety. The performance management database 108 organizes performance management data 112 according to a cross-hierarchical data model which is described in more detail below.

The memory 110 stores a performance management program 114. The performance management program 114 receives a portfolio view selection 116, and responsively retrieves a performance management data subset 118. The performance management data subset 118 may include any portion of the performance management data 112 including performance management targets defined in one more cross hierarchy fact tables.

The processor 102 executes the performance management reporting program 114 to render the portion of the performance data into a portfolio view in a graphical user interface on the display 106. As will be explained in more detail below, the portfolio views 120 are based on the performance management data 112, and more specifically based on the performance management data subset 118 corresponding to the portfolio view selection 116. The composition of the portfolio view rendered on the display 106 is determined by the portfolio view selection 116.

The input device 104 may be used to determine the portfolio view selection 116. The input device 104 may be a keyboard, mouse, or any other user interface device. In other implementations, the portfolio view selection 116 may be automatically determined without the use of input device 104. For example, an automated reporting program may generate portfolio view selections 116, compile performance management results, and deliver the results to a performance manager.

Figure 2:
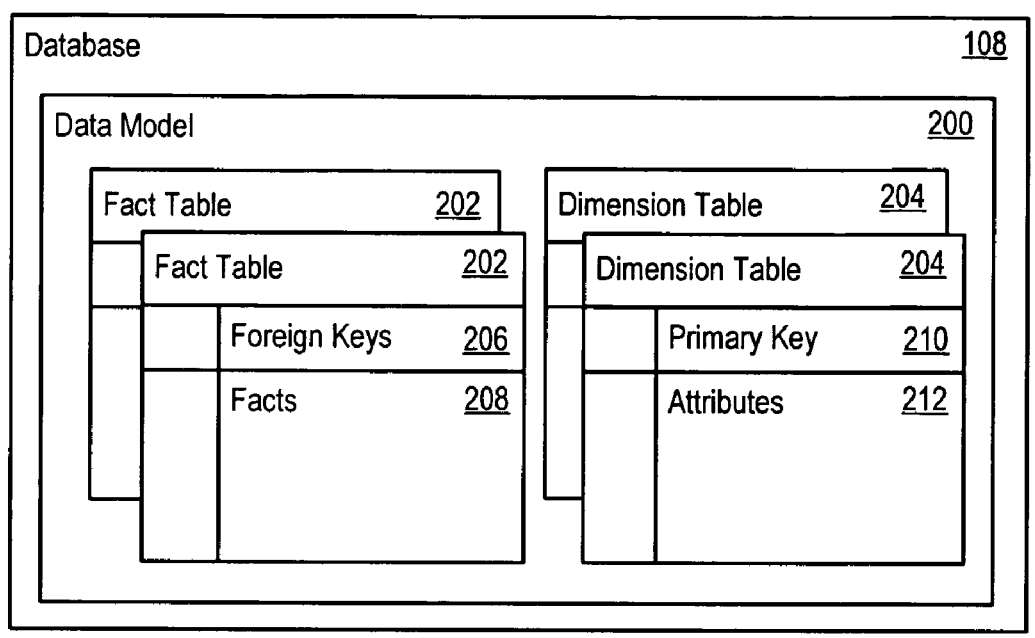
FIG. 2 shows a database implemented in the performance management system shown in FIG. 1.

FIG. 2 shows a database implemented in the performance management system shown in FIG. 1. The database 108 implements a multi-root performance management data model 200. The data model 200 includes fact tables 202 and dimension tables 204. The organization of the data model 200 may be derived from an entity relationship diagram, discussed in more detail below.

Dimensions describe different aspects of the performance management data. Each dimension table 204 includes a primary key 210 and attributes 212 which describe a particular dimension. Some examples of dimension tables include: area tables, which store area dimension data; client tables, which store client dimension data; and engagement tables, which store engagement dimension data. Each fact table 202 may include one or more foreign keys 206 and facts 208. Each foreign key 206 provides an association back to a dimension table. The combination of foreign keys 206 may act as a primary key for that fact table. The facts 208 may represent actual performance management data, target data (e.g., data which is pre-calculated and stored for the relevant metric and relevant portfolio aggregation of the metric), and performance range performance management data (which may also be pre-calculated and may be entered as a fact for the associated dimension.

The data model 200 implements multiple hierarchies and a cross-hierarchical structure. The cross-hierarchical structure provides a flexible mechanism for setting specific performance management targets at various levels of the reporting hierarchy. The performance management system 100 thereby implements enhanced performance management target setting and reporting.

Figure 3:
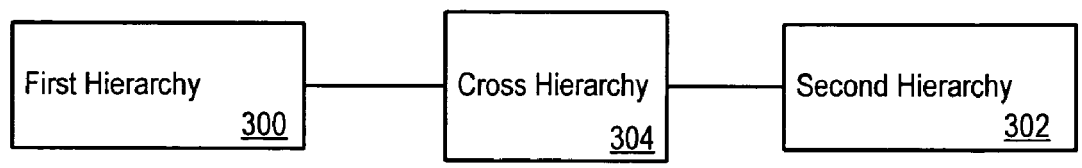
FIG. 3 shows a block diagram of a cross hierarchy in the database of FIG. 1.

FIG. 3 shows a block diagram of a cross hierarchy in the database of FIG. 1. FIG. 3 shows an example which includes a first hierarchy 300, a second hierarchy 302, and a cross hierarchy 304 between the first hierarchy 300 and the second hierarchy 302. Additional hierarchies and cross hierarchies may be included. The first and second hierarchies 300 and 302 may each contain one or more entities (e.g., one hierarchy may contain an areas entity and a geographic units entity) and their relationships. A hierarchy may be defined by the relationships between entities within the hierarchy, the subject matter of the entities within the hierarchy, or a combination thereof. One example of a hierarchy is a geographic hierarchy, including geographically related entities such as area, geographic units, and delivery locations entities. The cross hierarchy 304 may be a combined entity which stores information aggregated across independent hierarchies (e.g., actual and target performance information for a capability offering at a delivery location). Additional examples are given below.

Figure 4:
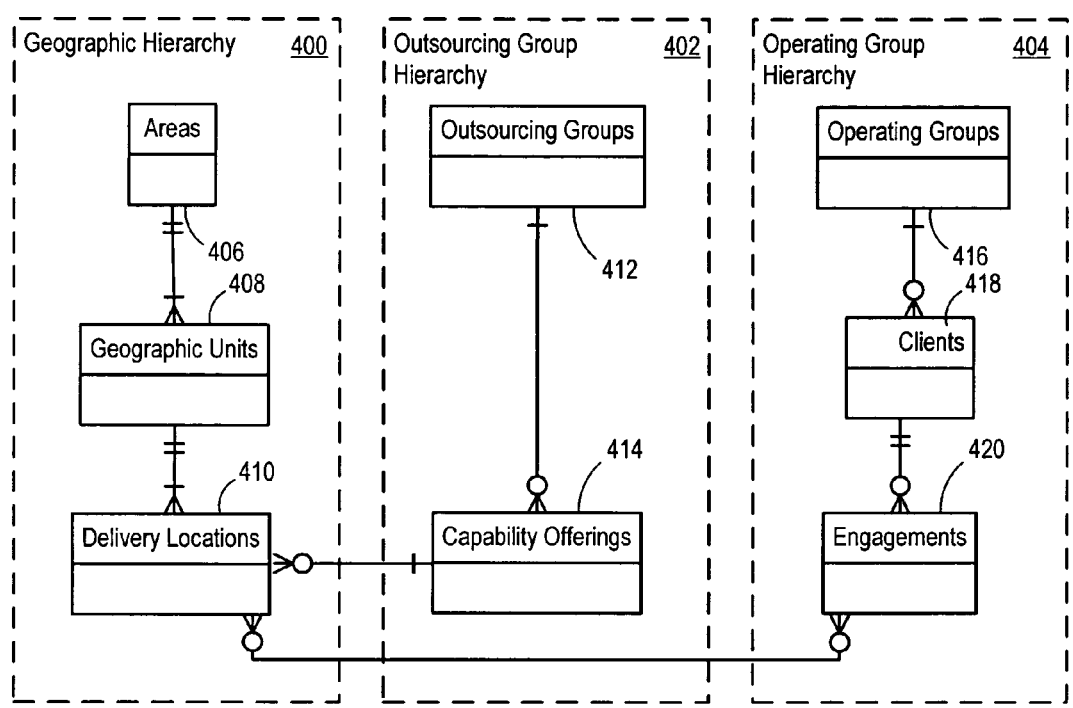
FIG. 4 shows an entity relationship diagram for a data model implemented by the database shown in FIG. 2.

FIG. 4 shows an example of an multi-root entity relationship diagram which includes a geographic hierarchy 400, an outsourcing group hierarchy 402, and an operating group hierarchy 404. Additional, fewer, or different hierarchies maybe defined. The geographic hierarchy 400 establishes relationships between geographically related entities. The geographic hierarchy 400 includes an areas entity 406, a geographic units entity 408, and a delivery locations entity 410. The outsourcing group hierarchy 402 establishes relationships between outsourcing group related entities. The outsourcing group hierarchy 402 includes an outsourcing groups entity 412 and a capability offerings entity 414. Similarly, the operating group hierarchy 404 establishes relationships between operating group related entities. The operating group hierarchy 404 includes an operating group entity 416, a clients entity 418, and an engagements entity 420.

An entity is an object that exists and is distinguishable from other objects. For instance, a business with a unique name may be an entity, because that business may be uniquely identified as one particular business in the universe. Each entity and its relationships with other entities may be used to derive a corresponding dimension table and its relationship with other dimension tables in the data model 200.

A relationship links or associates entities. Examples of relationships include one to one, one to many, and many to many relationships. However, other relationships may exist between entities.

The areas entity 406 may have a one to many relationship with the geographic units entity 408. For example, each area may have multiple geographic units. The geographic units entity 408 may have a one to zero or more relationship with the delivery locations entity 410. The delivery locations entity 410 may have a zero or more to one relationship with the capability offerings entity 414. In addition, the delivery locations entity 410 may have a zero or more to zero or more relationship with the engagements entity 420.

The outsourcing groups entity 412 may have a one to one or more relationship with the capability offerings entity 414. The capability offerings entity may have a one to one or one to many relationship with the engagements entity 420. In addition, as mentioned above, the capability offerings entity 414 may have a one to one or more relationship with the delivery locations entity (for example, one outsourcing capability offering is delivered from multiple locations) 410.

The operating groups entity 416 may have a one to one or more relationship with the clients entity 418. The clients entity 418 may have a one to one or more relationship with the engagements entity 420. The engagements entity 420 has relationships with the delivery locations and capability offerings entities as described above.

A relationship between at least two hierarchies implements a cross hierarchy. Cross hierarchies may exist between any entity in one hierarchy and any entity in another hierarchy. As an example, a cross hierarchy may be defined between one or more delivery locations and a capability offering. Cross hierarchies may be used to derive cross hierarchy fact tables in the data model and to flexibly establish performance management targets for the cross hierarchies The entity relationship diagram may define a data model which includes additional or different hierarchies each with their own relationships and entities. The hierarchies depicted may include additional, different, or fewer entities. One example is given below in the discussion of FIG. 14. Furthermore, there may be additional or different relationships than those depicted in FIG. 4.

Figure 5:
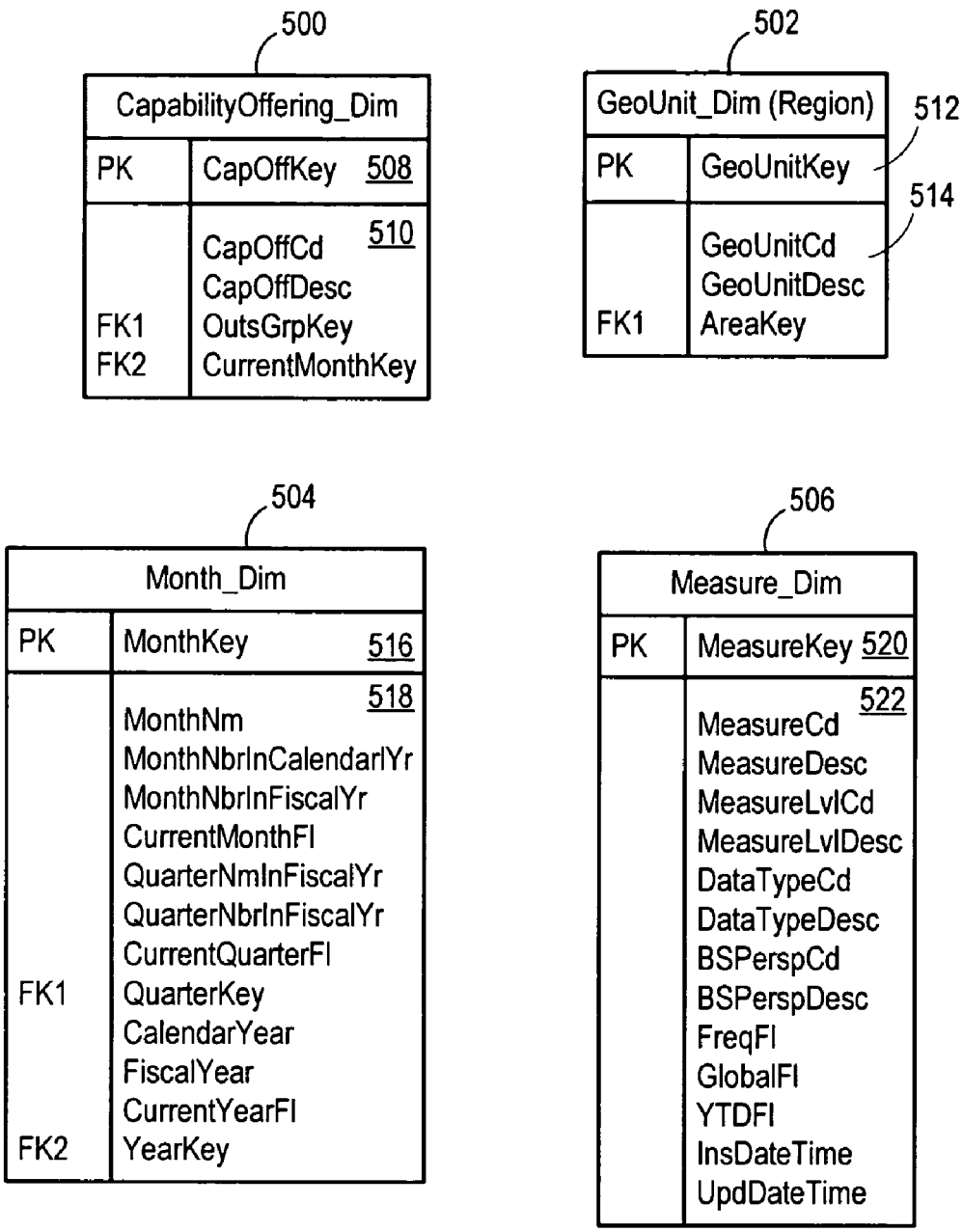
FIG. 5 shows examples of dimension tables which the data model may define in the database of the performance management system.

FIG. 5 shows four examples of dimension tables. The dimension tables include a capability offering dimension table 500, a geographic units dimension table 502, a month dimension table 504, and a measure dimension table 506. These dimension tables may be derived from the entity relationship diagram of FIG. 4.

The capability offering dimension table 500 includes a primary key, CapOffKey 508, which associates the capability offering dimension with a fact table. The capability offering dimension table 500 also includes capability offering attributes 510 that describe the characteristics of the capability offerings dimension. Examples of capability offerings attributes that may be included in the capability offering dimension table 500 include a capability offering code and a capability offering description. An example of a capability offering code is 'AO' which may correspond with a capability offering description of Application Outsourcing.

The geographic units dimension table 502 includes a primary key, GeoUnitKey 512, which associates the geographic units dimension with a fact table. The geographic units dimension table 502 also includes geographic unit attributes 514 that describe the characteristics of the geographic units dimension. Examples of geographic unit attributes that may be included in the geographic units dimension table 502 include geographic unit code and geographic unit description. An example of a geographic unit code is 'NA' which may correspond with a geographic unit description of North America.

The month dimension table 504 includes a primary key, MonthKey 516, which associates the month dimension with a fact table. The month dimension table 504 also includes month attributes 518 that describe the characteristics of the month dimension. An example of a month attribute is a month number (e.g., 1-12).

The measure dimension table 506 includes a primary key, MeasureKey 520, which associates the measure dimension with a fact table. The measure dimension table 506 also includes measure attributes 522 that describe the characteristics of the measure dimension. Examples of measure attributes 522 include the measure code and measure description. An example of a measure code is 'PPU' which indicates a measure description of price per unit. An additional example of a measure code is 'BV' which indicates a measure description of business value. Measures may be raw performance management data or computed from other performance management data. For example, price per unit may be raw performance management data while business value may be a computed value defined according to a pre-determined metric which takes into account one or more measures.

Table 1, below, provides an explanation for the performance management data which may be present in the measure dimension table 506, shown in FIG. 5:

TABLE 1

| | |
|---|---|
| MeasureCd | An identifier of the measure (e.g., Business Value, Revenue). |
| MeasureDesc | Text describing the measure. |
| MeasureLvlCd | An identifier of whether the measure is calculated (e.g., as a metric which takes into consideration additional measures) or is a directly obtained value. |
| MeasureLvlDesc | Text describing the measure level code. |
| DataTypeCd | An identifier of the data type (e.g., INT, FLOAT) |
| DataTypeDesc | Text describing the data type. |
| BSPerspCd | An identifier of which business perspective in the scorecard the measure belongs. |
| BSPerspDesc | Text describing the business perspective. |
| FreqFI | An identifier of the frequency of data (e.g., monthly, quarterly, non-monthly) |
| GlobalFI | An identifier of whether the measure is used by all capability offerings, specific capability offerings, or by some engagements. |
| YTDFI | An identifier of whether a corresponding year-to-date value is required for the measure. |
| InsDateTime | The date and time the measure dimension row was created. |
| UpdDateTime | The date and time the measure dimension row was last updated. |

FIG. 6 shows an example of a capability offering fact table 600 derived from the capability offering, month, and measure dimensions. Additional fact tables may be derived similarly from the dimension tables. The capability offering fact table 600 includes three foreign keys 602, CapOffKey, MeasureKey, and MonthKey, that associate the three different dimensions with the capability offering fact table 600. The capability offering fact table 600 also includes performance management data 604. Examples of types of performance management data 604 include actual performance management data, performance management targets, flag data, and comment data.

Table 2, below, provides an explanation for the performance management data which may be present in fact tables, such as those shown in FIGS. 6 and 7:

TABLE 2

| | |
|---|---|
| Value | The current value of the actual performance management data. |
| YTDValue | The year to date value of the actual performance management data. |
| OverallTarget | The overall performance management target value. |
| YTDTarget | The year to date performance management target value. |
| HighOverallTarget | The high overall performance management target value. |
| LowOverallTarget | The low overall performance management target value. |
| UpperRangeTarget | The upper range performance management target |

TABLE 2-continued

| | |
|---|---|
| | value. |
| LowerRangeTarget | The lower range performance management target value. |
| StatusFI | Indicates whether the actual value met the performance management target value. |
| TrendFI | Indicates the calculated slope of the actual values using linear regression techniques. |
| TrendingFI | Indicates whether the ideal slope of the actual values is up, down, or flat. |
| UpperLimitFI | Indicates whether the value has passed an upper limit threshold. |
| ABSFI | Indicates whether the value has been adjusted to the absolute value. |
| DSTFI | Indicates whether the actual value is being compared to double-sided target values. |
| InsDateTime | The date and time the performance management data was entered. |
| UpdDateTime | The date and time the performance management data was last updated. |
| CommentKey | Provides a link to a comment table which stores a comment on the contents of the fact table. |

Figure 7:
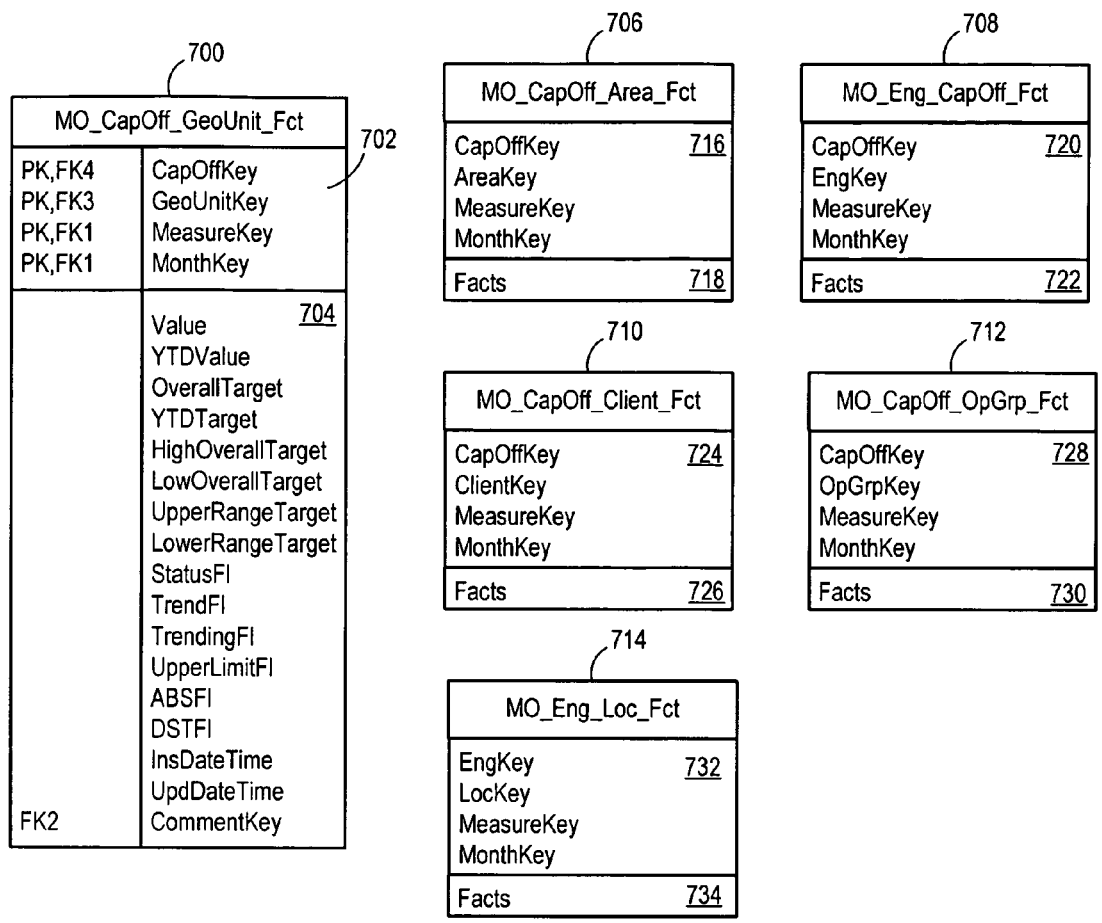
FIG. 7 shows a cross hierarchy fact table which the data model may define in the database of the performance management system.

FIG. 7 shows multiple cross hierarchy fact tables that may be established based on dimension tables derived from the entity relationship diagram of FIG. 4. The capability offering-geographic units cross hierarchy fact table 700 may be derived from the capability offering dimension table 500 of the outsourcing group hierarchy 402 and the geographic units dimension table 502 of the geographic hierarchy 400, the measure dimension table 506, and the month dimension table 504. The capability offering-geographic units cross hierarchy fact table 700 includes four foreign keys 702, CapOffKey, GeoUnitKey, MeasureKey, and MonthKey, that associate the four dimensions with the capability offering-geographic units cross hierarchy fact table 700. The capability offering-geographic units cross hierarchy fact table 700 also may include capability offering-geographic unit performance management data 704. Examples of capability offering-geographic unit performance management data 704 may include value, overall target, year to date target, high overall target, low overall target, upper range target, lower range target, and/or other facts.

The capability offering-geographic unit performance management data 704 allow specific target data to be set specifically for the capability offering-geographic unit cross hierarchy fact table. In other words, the performance management system 100 allows the definition of performance targets at any combination of dimensions. The resulting flexibility in defining performance targets delivers far greater knowledge and a more complete view of business performance.

Additional cross hierarchy fact tables may be established using combinations of foreign keys, each from a different hierarchy. FIG. 7 shows five additional examples. A capability offering-area cross hierarchy fact table 706 provides performance management targets specific to capability offerings and geographic areas (e.g., a target revenue for applications outsourcing in Americas may be established), a capability offering-engagements cross hierarchy fact table 708 provides performance management targets specific to capability offerings and engagements (e.g., a target average price per unit for specific engagement's application outsourcing), and a capability offering-client cross hierarchy fact table 710 provides performance management targets specific to capability offerings and clients (e.g., a target revenue for human resources outsourcing for a specific client). Additionally, a capability offering-operating group cross hierarchy fact table 712 provides performance management targets specific to capability offerings and operating groups (e.g., a target revenue for application outsourcing within the financial services operating group), and an engagements-delivery locations cross hierarchy fact table 714 provides performance management targets specific to engagements and delivery locations (e.g., a target price per unit for a specific engagement in Houston) may be established using the entity relationship diagram of FIG. 4. Additional or different cross hierarchy fact tables may be established according to an entity relationship diagram.

Each cross hierarchy fact table may be implemented by including the appropriate foreign keys in a fact table. For example, the capability offering-area cross hierarchy fact table uses the CapOffKey, AreaKey, MeasureKey, and MonthKey foreign keys 716. The capability offering-engagement cross hierarchy fact table includes the CapOffKey, EngKey, MeasureKey, and MonthKey foreign keys 720. The capability offering-client cross hierarchy fact table includes the CapOffKey, ClientKey, MeasureKey, and MonthKey foreign keys 726. The capability offering-operating group cross hierarchy fact table includes the CapOffKey, OpGrpKey, MeasureKey, and MonthKey foreign keys 730. The engagement-delivery location cross hierarchy fact table includes the EngKey, LocKey, MeasureKey, and MonthKey foreign keys 734.

Each cross hierarchy fact table may be populated with facts, such as aggregated metrics, targets, and performance ranges which are specifically set, calculated, or otherwise derived. An aggregated metric may be calculated or derived from other fact data and stored as a new fact at the aggregated level in the hierarchy or cross hierarchy. An aggregated metric summarizes or "rolls up" individual metrics associated with components of the cross-hierarchy. For example, a geographic-outsourcing group aggregated metric, such as percentage of Unplanned Attrition may be determined with the denominator as the total headcount for all engagements within the geographic-outsourcing group, aggregated for the specific cross-hierarchy, and the numerator as the total number of unplanned attritions for full time equivalents (FTEs) for all engagements within the geographic-outsourcing group aggregated for the specific cross hierarchy. The Unplanned Attrition aggregated metric is then stored as a fact in the geographic-outsourcing group cross hierarchy fact table. As another example, an operating group-outsourcing group aggregated metric (e.g., percentage service level agreements (SLAs) met) may represent a similar calculation based on a first metric associated with an entity in the operating group hierarchy and a second metric associated with an entity in the outsourcing group hierarchy.

The capability offering-area performance management data 718, capability offering-engagements performance management data 722, capability offering-client performance management data 726, capability offering-operating group performance management data 730, and engagement-delivery location performance management data 734 may include the same, additional, or different types of performance management data as the capability offering-geographic unit facts 704 described above. For example, each cross hierarchy fact table may be populated with specific performance management targets specific to that cross hierarchy.

FIG. 8 shows an example of a row 800 of the capability offering-geographic unit cross hierarchy fact table. The CapOffKey 802, GeoUnitKey 804, MeasureKey 806, and MonthKey 808 of this row may be used to index the respective dimension tables and determine the particular capability offering, geographic unit, measure, and month of interest in this row of the capability offering-geographic unit cross hierarchy fact table. For example, the foreign key values may correspond to application outsourcing as the capability offering, North America as the geographic unit, revenue as the measure, and January as the month. The facts for this specific row may have been previously collected, calculated, summarized, or may have been aggregated up from more specific underlying components.

The value field 810 indicates that application outsourcing in North America in January has produced $10,000,000 in revenue. Further, data in the value field 810 may be compared to the overall target defined in the overall target field 812, $12,000,000 in this example. The performance management system described above uses this performance management data from the application outsourcing engagements within North America to render a portfolio view on the display. Additional facts may be available in this row of the capability offering-geographic unit cross hierarchy fact table such as year to date target, high overall target, low overall target, upper range target, lower range target. Any facts may be used to render additional information on a portfolio view for an operator of the performance management system.

Figure 9:
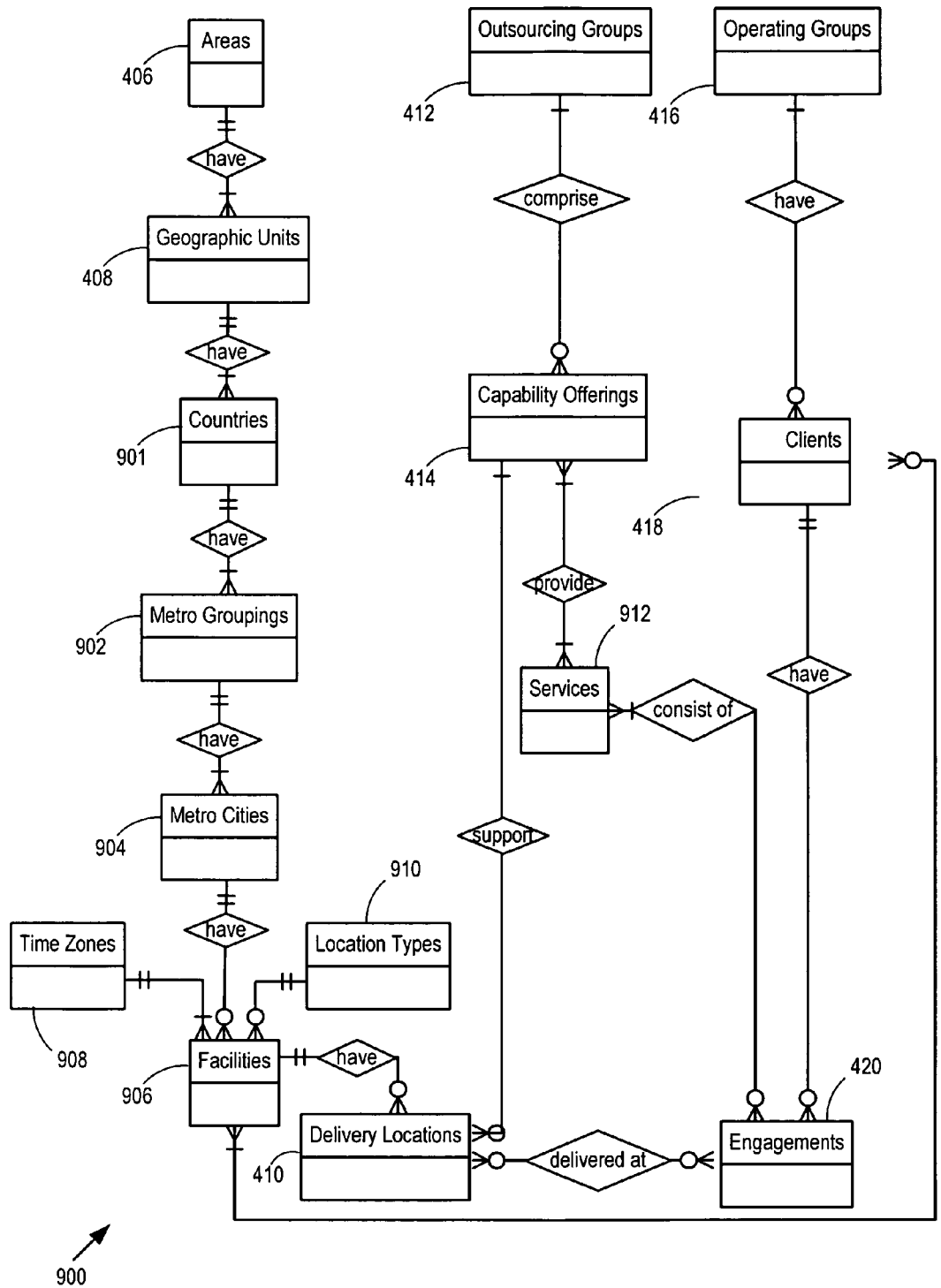
FIG. 9 shows an alternate entity relationship diagram for a data model implemented by the database shown in FIG. 2.

FIG. 9 shows a second example of an entity relationship diagram 900. The entity relationship diagram 900 includes three hierarchies: a geographic hierarchy, an outsourcing group hierarchy, and an operating group hierarchy. The areas entity 406, geographic units entity 408, countries entity 901, metro groupings entity 902, metro cities entity 904, facilities entity 906, time zones entity 908, location types entity 910, and delivery locations entity 410 belong to the geographic hierarchy. The outsourcing groups entity 412, capability offerings entity 414, and services entity 812 may belong to the outsourcing group hierarchy. The operating groups entity 416, clients entity 418, and engagements entity 420 may belong to the operating group hierarchy. As described above, these entities and relationships may be used to derive dimension tables and eventually cross hierarchy fact tables. Additional and/or different hierarchies may be implemented. Additional and/or different entities may be included in the entity relationship diagram.

Each entity may be represented with a dimension table in the data model 200. For example, the geographic hierarchy entities such as the areas entity 406 may be used to derive an area dimension table where each row describes a specific area (e.g., America or Europe). The geographic units entity 408 may be used to derive a geographic units dimension table where each row describes a specific geographic unit (e.g., North America or South America). The countries entity 901 may be used to derive a countries dimension table where each row describes a specific country (e.g., France or US). The metro groupings entity 902 may be used to derive a metro groupings dimension table where each row describes a specific metro grouping (e.g., Greater Los Angeles Area or Greater Chicagoland Area). The facilities entity 906 may be used to derive a facilities dimension table where each row describes a specific facility (e.g. Houston Facility or Chicago Facility). The time zones entity 908 may be used to derive a time zones dimension table where each row describes a specific time zone (e.g. Central Standard Time or Eastern Standard Time). The location types entity 910 may be used to derive a location types dimension table where each row describes a specific location type (e.g., a Client Site, a Local Delivery Center, or a Global Delivery Center). The delivery locations entity 410 may be used to derive a delivery locations dimension table where each row describes a specific delivery location (e.g. Houston or Chicago).

The outsourcing groups hierarchy entities such as the outsourcing groups entity 412 may be used to derive an outsourcing groups dimension table where each row describes a specific outsourcing group (e.g., business processing outsourcing or information technology outsourcing). The capability offerings entity 414 may be used to derive a capability offerings dimension table where each row describes a specific capability offering (e.g. application outsourcing or human resources outsourcing). The services entity 912 may be used to derive a services dimension table where each row describes a specific service, such as human resources outsourcing, payroll processing, recruiting, or benefits.

The operating groups hierarchy entities such as the operating groups entity 416 may be used to derive an operating groups dimension table where each row describes a specific operating group (e.g., resources or financial services). The clients entity 418 may be used to derive a client dimension table where each row describes a specific client. The engagements entity 420 may be used to derive an engagements dimension table where each row describes a specific engagement.

Figure 10:
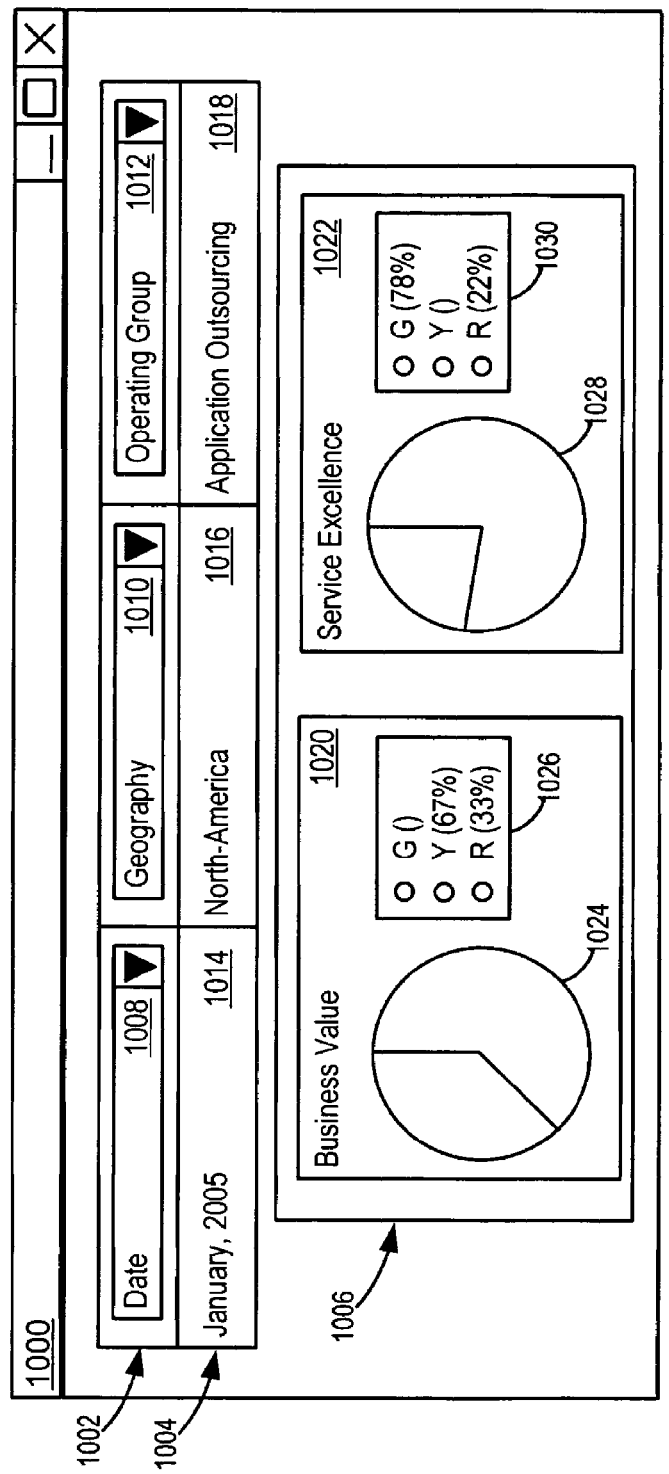
FIG. 10 shows a portfolio view generated by the performance management system.

FIG. 10 shows a portfolio view 1000 that may be generated by the processor 102 executing the performance management program 114. The portfolio view 1000 includes a portfolio view selection 1004 and a portfolio view parameter selector 1002. FIG. 10 also shows a rendered portion of performance management data 1006 responsive to the portfolio view selection 1004.

The portfolio view parameter selector 1002 provides an input mechanism through which an operator chooses a view of the performance management data. In the example shown in FIG. 10, the portfolio view parameter selector 1002 includes a date selector 1008, a geography selector 1010, and an operating group selector 1012. The portfolio view parameter selector 1002 may be implemented as a set of drop down menus, text entry fields, or any other operator input interface mechanisms. Each selector may provide selections from one or more hierarchies. Multiple selections (e.g., North America and Application Outsourcing) thereby specify a cross hierarchy which the performance management system 100 will render, including the specifically defined performance targets.

Figure 11:
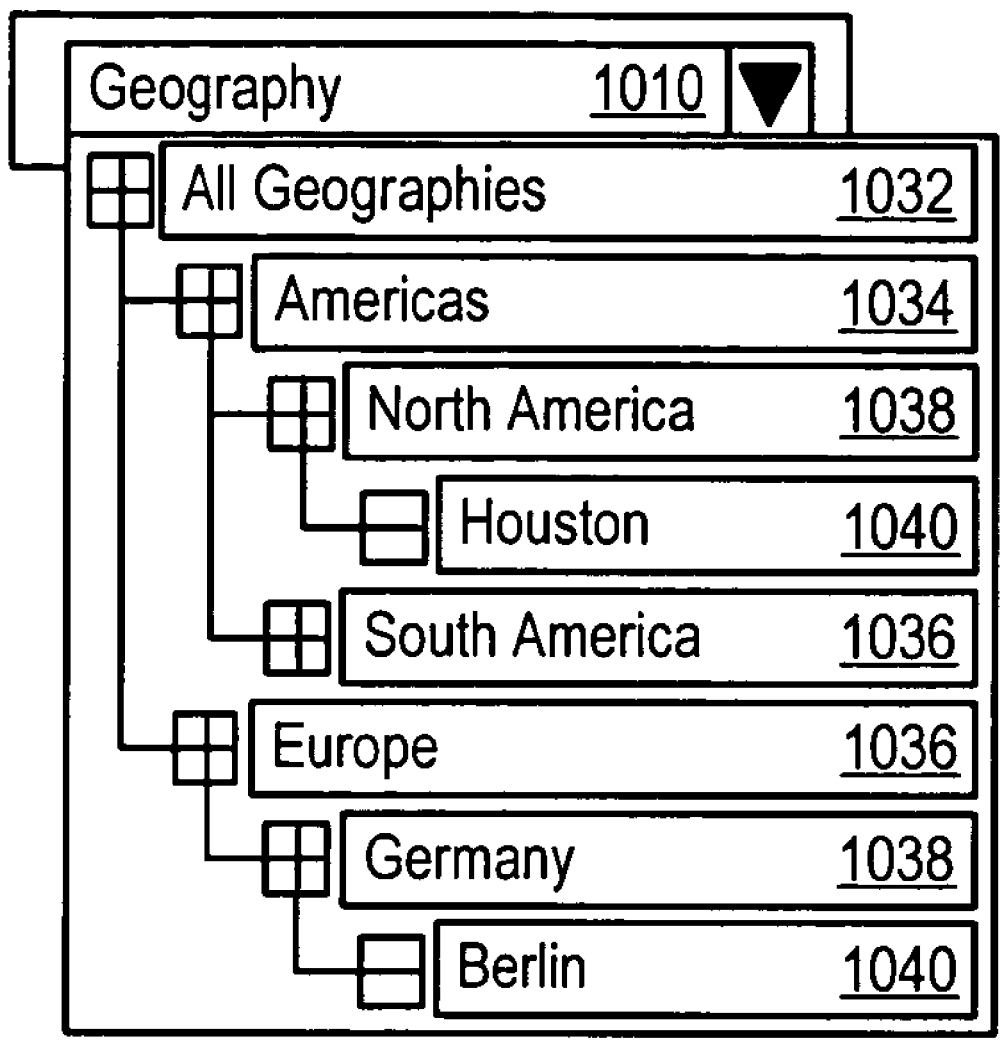
FIG. 11 shows a drop down menu which provides an input mechanism for operator selection of portfolio views.

FIG. 11 shows a drop down menu which provides an input mechanism for operator selection of portfolio views. The geography selector 1010 may include geography selections according to the geographic hierarchy discussed above. Specifically, a geography selection may be made according to area, geographic unit, and delivery location. For example, the geography selector 1010 provides an 'All Geographies' selection 1032 at the highest level of the selector 1010. The 'All Geographies' selection 1032 expands to provide the 'Americas' selection 1034 and 'Europe' selection 1036. The 'Americas' selection 1034 may be expanded to access geographic units, selected with the 'North America' selection 1038 or 'South America' selection 1036. The 'North America' selection 1038 expands to provide selections of individual delivery locations within 'North America' 1038 using the 'Houston' selection 1040. Similarly, the 'Europe' selection 1036 may be expanded into geographic units, selected, for example, with the 'Germany' selector 1038. The 'Germany' selector 1038 expands to provide a 'Berlin' selection 1040 as a delivery location. Any other geography selections may be implemented with the geography selector 1010.

The portfolio view selection 1004 includes the criteria selected through the portfolio view parameter selector 1004. In the example shown in FIG. 10, the portfolio view selection 1004 includes a date portfolio view selection 1014, a geography portfolio view selection 1016, and an operating group portfolio view selection 1018. The portfolio view selection 1014 may include additional and/or different selections of entities in any hierarchies defined in the data model 200.

The rendered portion of performance management data 1006 may include reporting elements such as stoplights, raw data, pie charts, color indicators, or any other reporting element. For example, the business value measure 1020 may be displayed using a pie chart 1024 or red, green, yellow stoplight indicators 1026. Another example includes the service excellence measure 1022 which also may be displayed using a pie chart 1028 or red, green, yellow stoplight indicators 1030. Business Value 1020 and Service Excellence 1022 are examples of metrics that the performance management system 100 or other system may determine and which the database 108 may store. However, any other metrics may be determined and stored for reporting through the portfolio view 1000.

Figure 12:
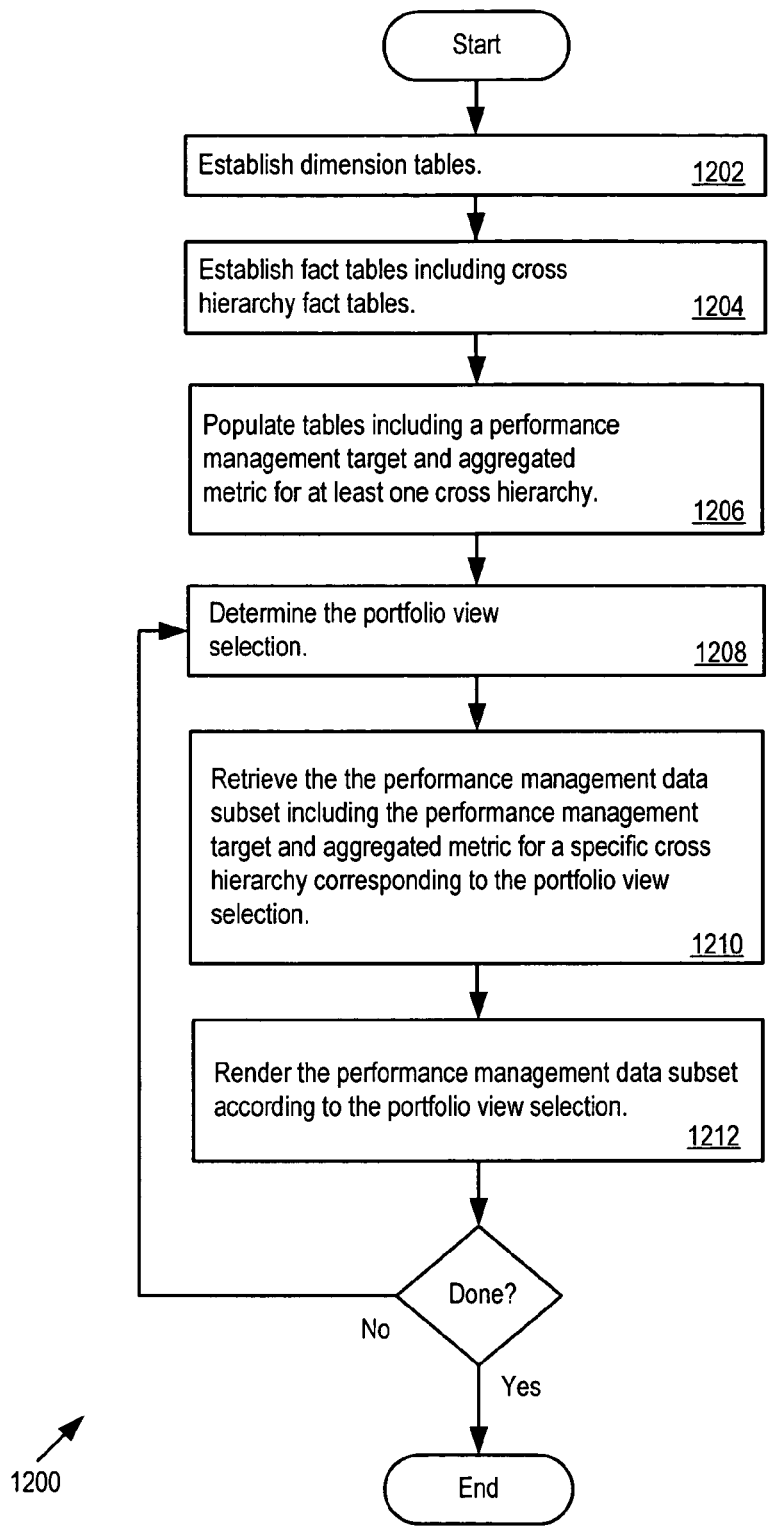
FIG. 12 shows the acts the performance management system may take to establish a database including cross-hierarchical targets, and to render performance management data according to a portfolio view selection.

FIG. 12 shows an example of the acts 1200 that may be taken by the performance management system 100 to display a portfolio view with a cross hierarchy fact table performance management target. The performance management system 100, through operator input or the performance management program, establishes fact and dimension tables including cross hierarchy fact tables 1202-1204. These tables may be populated with attributes and facts, including performance management targets for at least one cross hierarchy 1206. For example, an overall target, year to date target, high overall target, low overall target, upper range target, and/or lower range target may be established for any or all of the fat tables in the database.

The performance management program 114 determines the portfolio view selection 1208. This determination may be made by obtaining a portfolio view selection from the input device 104 or may be made by automated programs within the performance management system 100. One example of determining a portfolio view selection 1208 is given in FIG. 10, where the operator has selected specific view parameters from the portfolio view parameter selector 1004.

Once the portfolio view selection has been determined, the performance management system 100 retrieves the performance management data specified by the portfolio view selection 1210. The performance management data subset may include a cross hierarchy performance target and/or additional performance management data. The performance management data subset may then be rendered 1212. Referring to FIG. 10, the portfolio view 1000 is one example of a rendered portfolio view of the performance management data subset.

Figure 13:
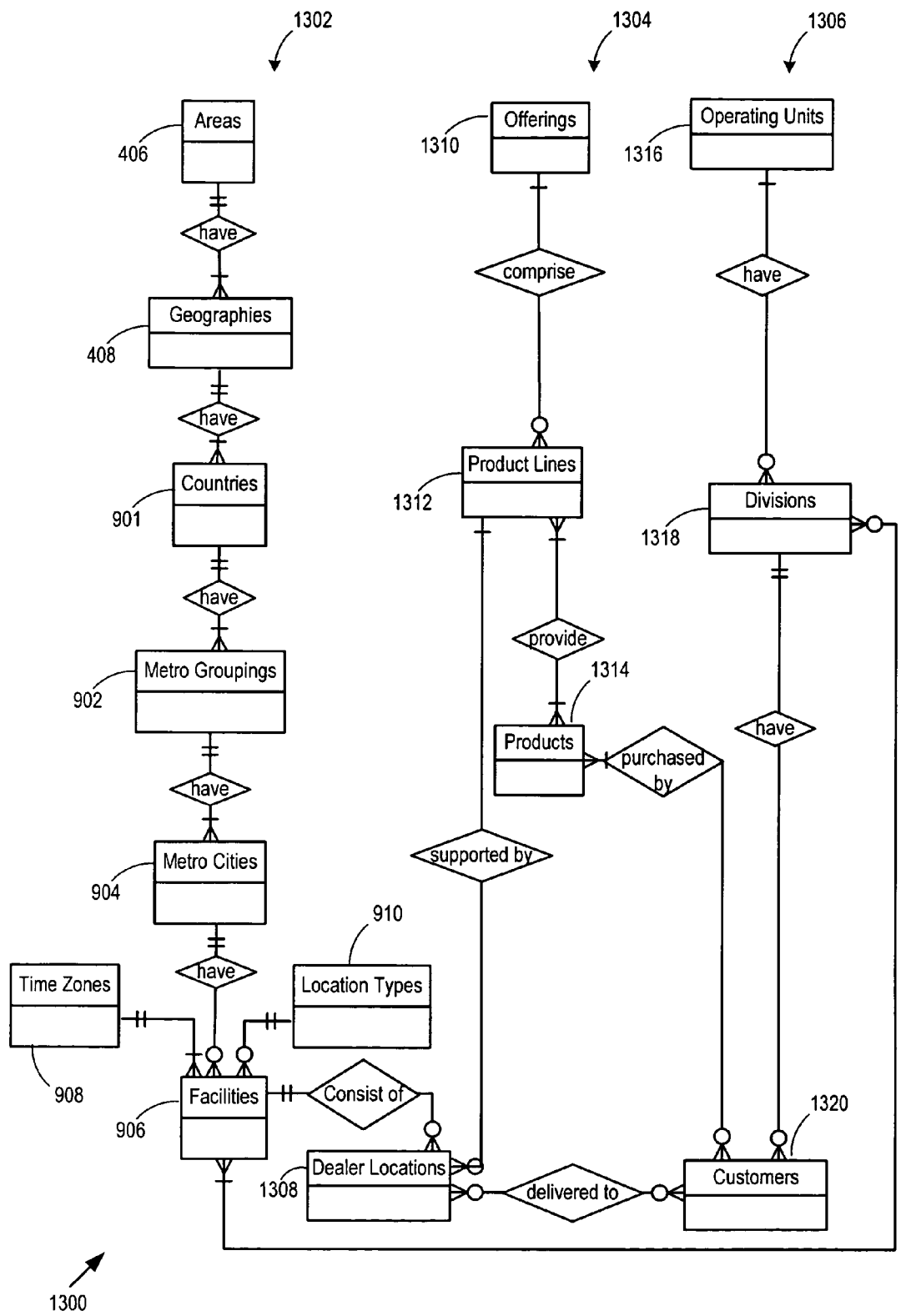
FIG. 13 shows an example of an entity relationship diagram for a data model which defines hierarchies and cross hierarchies for an original equipment manufacturer.

The multiple hierarchy entity relationship diagram provides a flexible mechanism for mapping any particular business to a high performance reporting data model which supports detailed metric reporting, target setting (including cross-hierarchy targets), and reporting. FIG. 13 shows an additional example of an entity relationship diagram 1300. The entity relationship diagram 1300 defines the hierarchies and cross hierarchies in a data model which provides significant performance reporting capability for an original equipment manufacturer (OEM). The entity relationship diagram defines a geographic hierarchy 1302, an offering hierarchy 1304, and an operating unit hierarchy 1306.

While the entity relationship diagram 900 shown in FIG. 9 is particularly effective for reporting on outsourcing operations, the entity relationship diagram adapts as shown in FIG. 13 to the OEM business. In particular, the entity relationship diagram 1300 adapts by replacing the outsourcing hierarchy with an OEM offering hierarchy and replacing the operating groups hierarchy with an OEM operating units hierarchy.

The geographic hierarchy 1302 may be implemented as noted above in the discussion of FIG. 9. However, the locations types 910 for an OEM (e.g. a printer manufacturer) may differ from the location types appropriate for outsourcing or other types of business activities. For an OEM, the locations types may correspond to a direct dealer, indirect dealer, a manufacturing location, a corporate office, or another type of OEM location. The underlying data model establishes corresponding dimension and fact tables to store the OEM location type data.

In addition, the geographic hierarchy 1302 may define a dealer location entity 1308. The dealer location entity 1308 establishes the locations where dealers exist for the OEM products.

In the OEM offering hierarchy 1304, an offering entity 1310 establishes the major OEM offerings. Such offerings may include printers, copiers, and scanners, as examples. Each offering is composed of product lines established by the product lines entity 1312. The product lines may represent groups of individual products which are closely related in some way (e.g., inkjet printers or laser printers). Each product line is composed of individual products (e.g., a color laser model Q45e). The products entity 1314 may establish the individual products in the product line.

In the OEM operating units hierarchy 1306, an operating unit entity 1316 establishes the distinct organizations under the umbrella OEM company as a whole. The operating units hierarchy 1306 also defines a divisions entity 1308. The divisions entity 1318 establishes sub-parts of the individual distinct organizations. In addition, a customers entity 1320 in the operating units hierarchy 1306 may establish customers for the divisions, and may establish the customer to which specific dealer locations deliver products.

The OEM entity relationship diagram 1300 also defines cross hierarchies. As noted above, the cross hierarchies allow performance management tracking, target setting, and reporting at specific and precise combinations of entities in the entity relationship diagram 1300. In FIG. 13, a cross hierarchy exists between the products entity 1314 and the customer entity 1320. A second cross hierarchy exists between the dealer locations entity 1308 and the customers entity 1320. Thus, in the example given in FIG. 13, powerful performance management capabilities exist for reporting on products delivered to customers through the product-customer cross hierarchy, and for reporting on dealer location deliveries to customers through the dealer location-customer cross hierarchy. Other cross hierarchies may be established, and the entity relationship diagram may be adapted (e.g., with more, fewer, or different hierarchies) to other businesses or business activities.

Figure 14:
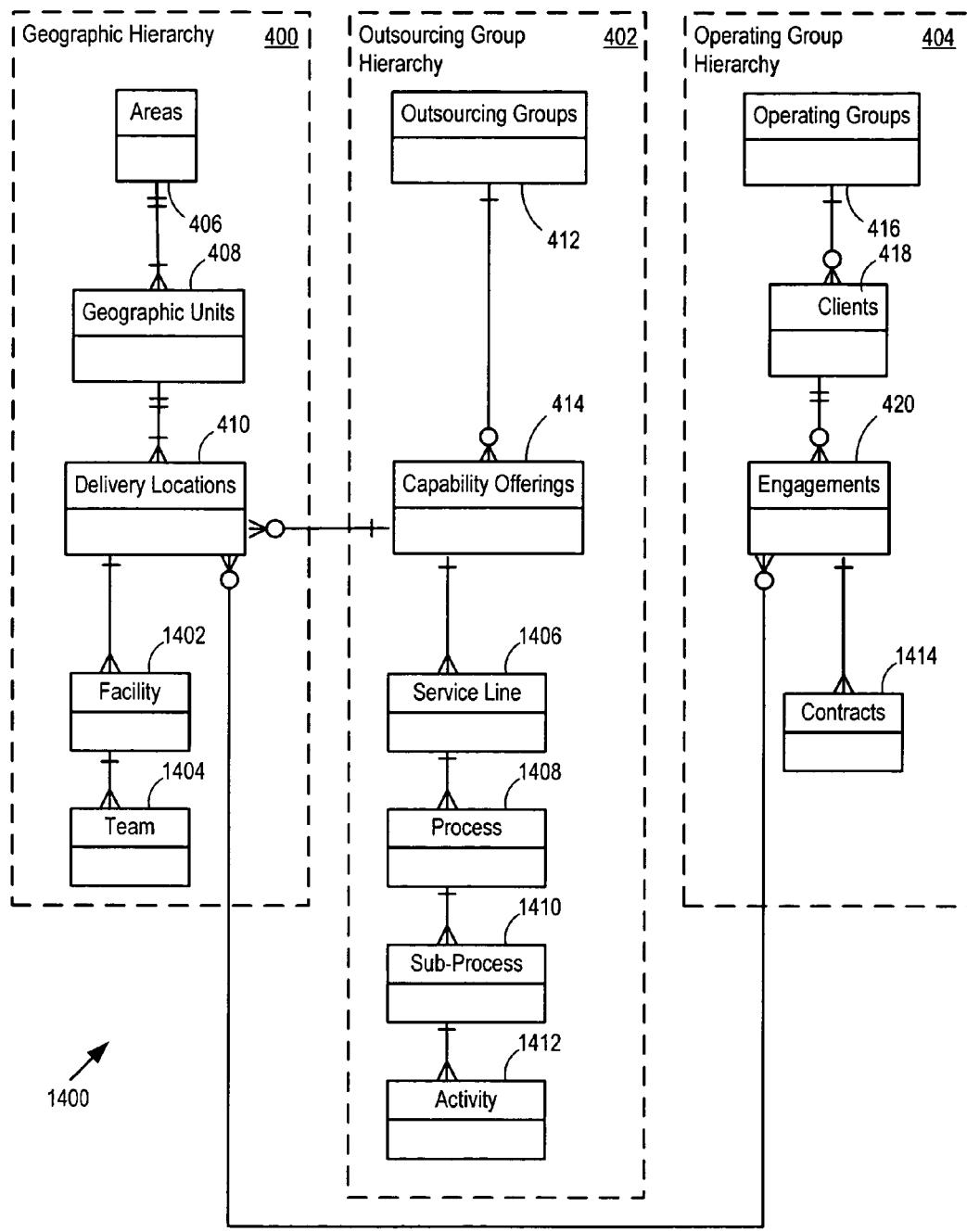
FIG. 14 shows another example of an entity relationship diagram for a data model.

FIG. 14 shows another example of an entity relationship diagram 1400, and is based on the entity relationship diagram 400. The entity relationship diagram 1400 extends the functionality established in the operating group hierarchy 404, the outsourcing group hierarchy 402, and the geographic hierarchy 400. Any of the other entity relationship diagrams may be adapted to add the same or similar entities.

The geographic hierarchy 400 is extended to include a facility entity 1402 and a team entity 1404. The outsourcing group hierarchy 402 is extended to add a service line entity 1406, a process entity 1408, a sub-process entity 1410, and an activity entity 1412. The operating group hierarchy is extended to add a contracts entity 1414. One or more cross hierarchies may be established between any of the entities in any of the hierarchies shown in FIG. 14.

The entity relationship diagram 1400 defines a data model for which each delivery location may have one or more associated facilities, and for which each facility may have one or more teams of individuals located at or responsible for the facility. Accordingly, the resulting data model establishes finer granularity in the geographic hierarchy 400, and adds detailed reporting capability for the facilities and teams.

Similarly, the entity relationship diagram 1400 defines a data model for which each capability offering may have one or more associated service lines. Each service line may then have one or more defined processes which implement the service lines. The resulting data model delivers enhanced reporting granularity for the outsourcing group hierarchy 402. In a further extension of the outsourcing group hierarchy 402, the sub-process entity 1410 may establish one or more sub-processes performed for each process entity 1408. Similarly, each activity entity 1412 may establish one or more activities performed in carrying out each of the sub-processes.

The contracts entity 1414 extends the operating group hierarchy 404. Thus, each engagement may be associated with one or more specific contracts. As a result, the data model establishes a mechanism which provides target monitoring, tracking, and reporting for each contract for each engagement. In addition, however, the performance management system may aggregate data received at the contract level up to the engagement level. As a result, the performance management system may deliver a portfolio view for the engagement across all contracts.

It is intended that the foregoing detailed description be regarded as illustrative rather than limiting, and that it be understood that it is the following claims, including all equivalents, that are intended to define the spirit and scope of this invention.

The invention claimed is:

1. A cross hierarchy performance management system comprising: a database comprising: a geographic hierarchy that establishes relationships between geographically related entities; a geographical dimension table dimensioned by the geographically related entities and comprising geographical attributes that describe geographical dimensions for the geographically related entities; an outsourcing group hierarchy that establishes relationships between outsourcing group related entities; an outsourcing group dimension table dimensioned by the outsourcing group related entities and comprising outsourcing group attributes that describe outsourcing group dimensions for the outsourcing group related entities; an operating group hierarchy that establishes relationships between operating group related entities; an operating group dimension table dimensioned by the operating group related entities and comprising operating group attributes that describe operating group dimensions for the operating group related entities; performance management data stored in the database and comprising a pre-calculated geographic-outsourcing group performance target for a geographic-outsourcing group aggregated metric and a pre-calculated operating group-outsourcing group performance target for an operating group-outsourcing group aggregated metric; a first cross hierarchy between the geographic hierarchy and the outsourcing group hierarchy, the first cross hierarchy comprising: a geographic-outsourcing group cross hierarchy fact table comprising: a first cross hierarchy key that links the geographic-outsourcing group cross hierarchy fact table to the geographic hierarchy and the outsourcing group hierarchy; where the geographic-outsourcing group performance target is absent from the first cross hierarchy fact table key; and where the geographic-outsourcing group aggregated metric is absent from the first cross hierarchy fact table key; a second cross hierarchy between the operating group hierarchy and the outsourcing group hierarchy, the second cross hierarchy comprising: an operating group-outsourcing group cross hierarchy fact table comprising: a second cross hierarchy key that links the operating group-outsourcing group cross hierarchy fact table to the operating group hierarchy and the outsourcing group hierarchy; the operating group-outsourcing group performance target; the operating group-outsourcing group aggregated metric, where the operating group-outsourcing group aggregated metric is absent from the second cross hierarchy fact table key; a memory comprising a performance management reporting program that: obtains a portfolio view selection from an operator; retrieves a portion of the performance management data and the aggregated metrics based on the portfolio view selection, including at least one of the geographic-outsourcing group performance target and an operating group-outsourcing group performance target; and renders the portion of the performance management data as a portfolio view; and a processor coupled to the database and the memory which executes the performance management program.

2. The performance management system of claim 1, where the geographic-outsourcing group cross hierarchy fact table comprises an area-capability offering cross hierarchy fact table.

3. The performance management system of claim 1, where the operating group-outsourcing group cross hierarchy fact table comprises a client-capability offering cross hierarchy fact table.

4. The performance management system of claim 1, where the operating group-outsourcing group cross hierarchy fact table comprises an operating group-capability offering cross hierarchy fact table.

5. The performance management system of claim 1, where the database further comprises: a third cross hierarchy between the geographic hierarchy and the operating group hierarchy, the third cross hierarchy comprising: geographic-operating group cross hierarchy fact table including a geographic-operating group performance target.

6. The performance management system of claim 5, where the geographic-operating group cross hierarchy fact table comprises an engagement-location cross hierarchy fact table.

7. The performance management system of claim 1, where the portfolio view comprises an offering-by-area view.

8. The performance management system of claim 1, where the portfolio view comprises a client-by-offering view.

9. The performance management system of claim 1, where the portfolio view comprises an engagement-by-location view.

10. The performance management system of claim 1, where the outsourcing group hierarchy comprises an outsourcing group-capability offering hierarchy.

11. The performance management system of claim 1, where the operating group hierarchy comprises an operating group-client hierarchy.

* * * * *